United States Patent
Meagher et al.

(10) Patent No.: US 8,699,886 B2
(45) Date of Patent: Apr. 15, 2014

(54) EXTERNALLY SYNCHRONIZED OPTICAL TRANSPORT NETWORK SYSTEMS AND ASSOCIATED METHODS

(75) Inventors: Kevin S. Meagher, Bowie, MD (US); James M. Allard, Middletown, MD (US); Michael S. Brown, Baltimore, MD (US)

(73) Assignee: Ciena Corporation, Hanover, MD (US)

( * ) Notice: Subject to any disclaimer, the term of this patent is extended or adjusted under 35 U.S.C. 154(b) by 1529 days.

(21) Appl. No.: 11/592,663

(22) Filed: Nov. 3, 2006

(65) Prior Publication Data

US 2007/0116061 A1    May 24, 2007

Related U.S. Application Data

(60) Provisional application No. 60/739,119, filed on Nov. 23, 2005.

(51) Int. Cl.
*H04B 10/00* (2013.01)
*H04B 10/12* (2011.01)

(52) U.S. Cl.
USPC ............ 398/154; 398/173; 398/174; 398/175

(58) Field of Classification Search
USPC ............ 398/97, 105, 154, 173–176; 375/354–376
See application file for complete search history.

(56) References Cited

U.S. PATENT DOCUMENTS

| | | | |
|---|---|---|---|
| 7,106,968 B2 * | 9/2006 | Lahav et al. | 398/47 |
| 7,286,487 B2 * | 10/2007 | Perkins et al. | 370/253 |
| 7,542,483 B1 * | 6/2009 | Gianella et al. | 370/503 |
| 2003/0016416 A1 * | 1/2003 | Wolf | 359/139 |
| 2003/0094982 A1 * | 5/2003 | Zampetti et al. | 327/159 |
| 2003/0123493 A1 * | 7/2003 | Takahashi | 370/539 |
| 2003/0190003 A1 * | 10/2003 | Fagerhoj | 375/372 |
| 2004/0156325 A1 * | 8/2004 | Perkins et al. | 370/299 |
| 2005/0163162 A1 * | 7/2005 | Lanzone et al. | 370/471 |

* cited by examiner

*Primary Examiner* — Daniel Dobson
(74) *Attorney, Agent, or Firm* — Clements Bernard PLLC; Christopher L. Bernard; Lawrence A. Baratta, Jr.

(57) ABSTRACT

The present invention utilizes external synchronization to generate a completely standardized or functionally standardized optical transmission unit of level k (OTUk[V]) signal providing less jitter and wander build-up through a network of optical transport network (OTN) elements. This increases noise margins of transported signals and payloads. The present invention provides stratum-level synchronization utilizing a standards-based approach. In one embodiment of the present invention, rate adapters are included to provide m/n scaling of OTUk[V] signals to rates common in SONET and SDH synchronizers to provide line and loop distribution of timing through OTUk[V] signals. The present invention provides a choice of external synchronization sources including building integrated timing source (BITS), line, and loop timing sources. In another exemplary embodiment, the present invention provides multiple external references and automated timing protection switching for redundancy and reliability.

17 Claims, 12 Drawing Sheets

**Synchronization Modifications to Figure 14-49/G.798 -
ODUkP/ODU[i]j_A_So processes**

**Synchronization additions to
Figure 14-18/G.798 - ODUkP/CBRx-a_A_So processes**

EXTERNALLY SYNCHRONIZED OPTICAL TRANSPORT NETWORK SYSTEMS AND ASSOCIATED METHODS

CROSS-REFERENCE TO RELATED APPLICATION(S)

The present non-provisional patent application claims priority to U.S. Provisional Patent Application No. 60/739,119 filed Nov. 22, 2005, and entitled "EXTERNALLY SYNCHRONIZED OPTICAL TRANSPORT NETWORK MULTIPLEXER SYSTEMS AND ASSOCIATED METHODS", which is incorporated in-full by reference herein.

FIELD OF THE INVENTION

The present invention relates generally to the telecommunications and optical networking fields. More specifically, the present invention relates to externally synchronized optical transport network (OTN) systems and associated methods.

BACKGROUND OF THE INVENTION

OTN multiplexing is an alternative to synchronous optical network/synchronous digital hierarchy (SONET/SDH) multiplexing, and its simplified justification scheme provides a number of advantages when multiplexing 2.5 Gbps signals and above. OTN multiplexing does not, however, address lower-rate signals (such as Gigabit Ethernet (GbE), T1, T3, etc.), which would require multiplexing into SONET/SDH or proprietary frame formats before being handled by an OTN multiplexer. The simplified OTN frame format, multiplexing scheme, and justification methodology provide for a more straightforward and scalable hardware design than SONET/SDH methodologies.

In general, the OTN multiplexing methodology is described in the International Telecommunications Union (ITU-T) documents, including G.709 "Interfaces for the Optical Transport Network (OTN)" and G.798 "Characteristics of optical transport network hierarchy equipment functional blocks" (6/2004). G.709 defines the interfaces of the optical transport network to be used within and between subnetworks of the optical network, in terms of: optical transport hierarchy (OTH); functionality of the overhead in support of multi-wavelength optical networks; frame structures; bit rates; and formats for mapping client signals. G.798 covers the functional requirements of Optical Transport Network functionality within equipment.

OTN multiplexing includes a layered structure including Optical Payload Unit of level k (OPUk) defined within Optical Data Unit of level k (ODUk), defined within Optical Transport Unit of level k (OTUk). The OPUk is the information structure used to adapt client information for transport over an optical channel. It includes client information together with any overhead needed to perform rate adaptation between the client signal rate and the OPUk payload rate and other OPUk overhead supporting the client signal transport. This overhead is adaptation specific. OPUk capacities for k=1, k=2, k=3 are defined.

The ODUk is an information structure consisting of the information payload (OPUk) and ODUk related overhead. ODUk capacities for k=1, k=2, k=3 are defined. The path optical data unit k (ODUkP) is the information structure used to support the end-to-end ODUk trail. The optical channel transport units of level k (OTUk and OTUkV) are the information structure used for transport of an ODUk over one or more optical channel connections. The OTUk is a completely standardized optical transmission unit of level k and the OTUkV is a functionally standardized optical transmission unit of level k. Each consists of the optical data unit and OTUk related overhead (forward error correction (FEC) and overhead for management of an optical channel connection). It is characterized by its frame structure, bit rate, and bandwidth. OTUk capacities for k=1, k=2, k=3 are currently defined.

In OTN multiplexing, client streams such as OC48/STM-16 are mapped bit-for-bit, such that they can be transmitted bit-for-bit at the frequency at which they were initially received. No SONET/SDH framing is required for transmitting the transported signals. Each OC48/STM-16 is carried both 100% bit-transparently and with its original independent timing. OTN is transparent to the payload it transports within the ODUk and that the OTN layer does not need to transport network synchronization since network synchronization can be transported within the payload, i.e. by SONET/SDH client tributaries.

For carriers wishing to provide wavelength services, OTN multiplexing provides a simpler, more straightforward, and ultimately more cost-effective, transport mechanism than SONET/SDH. However, OTN multiplexing is limited by the ITU-T specifically excluding network synchronization between network elements (NEs) from OTN specifications.

Testing and analysis has confirmed that jitter and wander noise accumulate to levels above that which network operators are comfortable with. For example, the jitter generation specification limits jitter to 100 mUI pkpk and 10 mUI rms. Network operators prefer numbers below 90 mUI pkpk and 9 mUI rms. These tests are supposed to be performed with a jitter-free source, but customers typically test over one or more spans. After several non-synchronized, concatenated OTN multiplexers, the jitter generated is over the 90 mUI pkpk and 9 mUI rms levels. When the same testing is performed over synchronized, concatenated spans, the jitter generation drops below 50 mUI pkpk and 5 mUI rms. Other, non-SONET/SDH signals, such as video transport, require even tighter jitter and wander limits.

Without synchronization, extreme filtering of the transmitted signal could reduce the noise to more acceptable limits. However, such measures would involve extensive testing, and efficacy would vary from run to run, product to product, and vendor to vendor. The filtering would involve proprietary solutions, not well understood and not verified under real world experience.

Of note, 100% bit-transparent multiplexing of SONET/SDH signals has been in demand for many years. Several proprietary approaches have been developed, with varied success. OTN multiplexing is a solution to this problem, and is a standards-based approach that will be in high demand. Once addressed, the lack of external synchronization will become an issue. Having a synchronization-optional approach will thus be an advantage.

BRIEF SUMMARY OF THE INVENTION

The present invention utilizes external synchronization to generate a completely standardized or functionally standardized optical transmission unit of level k (OTUk[V]) signal providing less jitter and wander build-up through a network of OTN network elements. This increases noise margins of transported signals and payloads. The present invention provides stratum-level synchronization utilizing a standards-based approach. In one embodiment of the present invention, rate adapters are included to provide m/n scaling of OTUk[V] signals to rates common in SONET and SDH synchronizers to provide line and loop distribution of timing through OTUk

[V] signals. The present invention provides a choice of external synchronization sources including building integrated timing source (BITS), line, and loop timing sources. In another exemplary embodiment, the present invention provides multiple external references and automated timing protection switching for redundancy and reliability.

OTN transport was created to exclude the necessity of external synchronization. Jitter and wander noise are treated as component filtering problems, and addressed as such. The present invention incorporates external synchronization with OTN multiplexing as part of an overall system approach to solving jitter and wander noise problems.

In various exemplary embodiments, the present invention replaces a free run oscillator with a synchronization subsystem within various OTN adaptation source processes. In one exemplary embodiment, the present invention includes a synchronization subsystem in place of the free run oscillator in the ODUkP to ODU[i]j adaptation source process. In another exemplary embodiment, the present invention includes a synchronization subsystem in place of the free run oscillator in the ODUkP to CBRx adaptation source process. The synchronization subsystem is configured to accept an external timing reference signal and can include multiple input timing sources, line source pre-selection, line rate conversion, reference selection, pre-scaling, out-of-range (OOR) detection, stratum synchronization, and a clock multiplier for scaling reference rates.

In an exemplary embodiment of the present invention, an externally synchronized optical transport network (OTN) network element includes circuitry configured to generate a completely standardized or functionally standardized optical transmission unit of level k (OTUk[V]); and a clock synchronizer subsystem connected to the circuitry, wherein the clock synchronizer subsystem is configured to generate an output clock synchronous with an active timing reference. The active timing reference can be selected from input sources to the clock synchronizer subsystem and the input sources to the clock synchronizer subsystem can include one or more of an external reference, a line reference, and a combination thereof. Optionally, the clock synchronizer subsystem comprises an out-of-range detector configured to detect degraded or failed input sources and the clock synchronizer subsystem can perform n/m rate conversion to provide a compatible rate when utilizing the line references as the input source. Alternatively, the clock synchronizer subsystem includes holdover functionality when all input sources fail and free run functionality, wherein the free run functionality includes a free run oscillator which is provisioned as the active timing reference when provision and when all input sources fail and holdover cannot be used. Also, the circuitry can be configured to perform the path optical data unit of level k (ODUkP) to constant bit rate signal of rate x (CBRx) adaptation source process while generating the OTUk[V] and the externally synchronized OTN network element includes either a network synchronized transponder or regenerator.

In another exemplary embodiment of the present invention, an optical transport network (OTN) utilizing external synchronization to reduce jitter and wander build-up includes an origin node operable to transmit one or more OTN signals over an optical fiber; multiple spans of regenerators connected to the origin node by the optical fiber, the regenerators operable to perform optical to electrical to optical conversion of the one or more OTN signals; one or more network synchronization nodes connected to the optical fiber, the network synchronization nodes located after each of the multiple spans of regenerators and the network synchronization nodes operable to perform network synchronization on the one or more OTN signals with a network timing reference while performing optical to electrical to optical conversion; and a terminal node connected to the origin node through the optical fiber and the multiple spans of regenerators and one or more network synchronization nodes, the terminal node operable to receive the one or more OTN signals. The origin node can include an OTN multiplexer operable to generate a completely standardized or functionally standardized optical transmission unit of level k (OTUk[V]) signal with the network timing reference for synchronization. Optionally, one or more OTN signals are transmitted over an optical fiber utilizing dense wave division multiplexing (DWDM).

In a further exemplary embodiment of the present invention, a method for optical transport network (OTN) multiplexing with external synchronization includes receiving j and optionally i optical data unit (ODU) connection point inputs, where j=1 or 2, i=1, and i<j; receiving a network synchronized clock reference, wherein the network synchronized clock reference is synchronized with an active timing reference; and generating a path optical data unit of level k (ODUkP) output where k=2 or 3 from the connection point inputs utilizing the network synchronized clock reference for justification control and generation. The active timing reference can be selected from input sources, the input sources comprise one or more of an external reference, a line reference, and a combination thereof.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention utilizes external synchronization to generate a completely standardized or functionally standardized optical transmission unit of level k (OTUk[V]) signal providing less jitter and wander build-up through a network of OTN network elements. This increases noise margins of transported signals and payloads. The present invention provides stratum-level synchronization utilizing a standards-based approach. In one embodiment of the present invention, rate adapters are included to provide m/n scaling of OTUk[V] signals to rates common in SONET and SDH synchronizers to provide line and loop distribution of timing through OTUk [V] signals. The present invention provides a choice of external synchronization sources including building integrated timing source (BITS), line, and loop timing sources. In another exemplary embodiment, the present invention provides multiple external references and automated timing protection switching for redundancy and reliability.

In various exemplary embodiments, the present invention replaces a free run oscillator with a synchronization subsystem within various OTN adaptation source processes. In one exemplary embodiment, the present invention includes a synchronization subsystem in place of the free run oscillator in the ODUkP to ODU[i]j adaptation source process. In another exemplary embodiment, the present invention includes a synchronization subsystem in place of the free run oscillator in the ODUkP to CBRx adaptation source process. The synchronization subsystem is configured to accept an external timing reference signal and can include multiple input timing sources, line source pre-selection, line rate conversion, reference selection, pre-scaling, out-of-range (OOR) detection, stratum synchronization, and a clock multiplier for scaling reference rates.

Figure 1A:
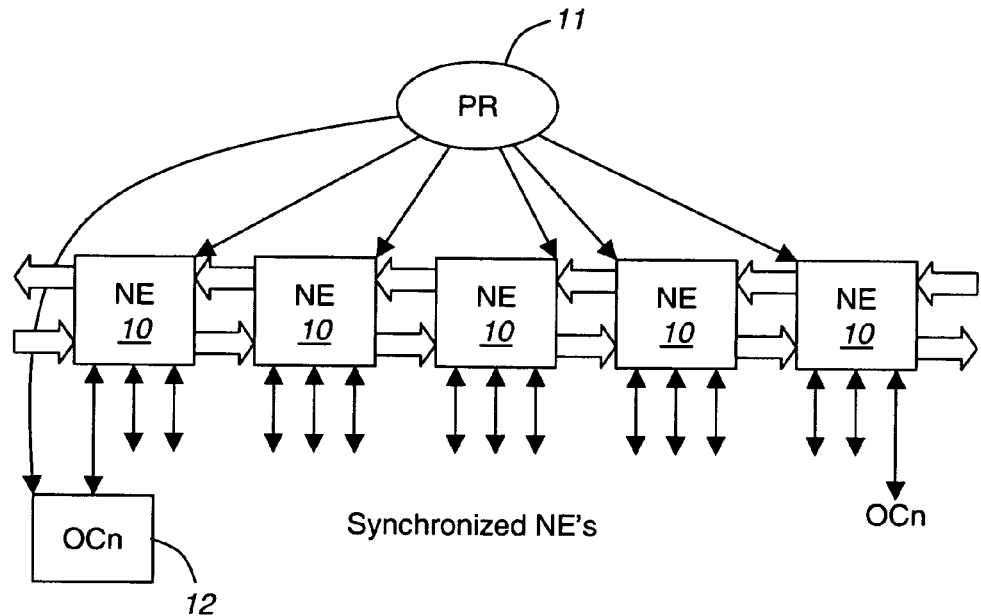
FIGS. 1a-1b illustrate synchronous and asynchronous network elements (NEs) in an exemplary network configuration.
Figure 1B:
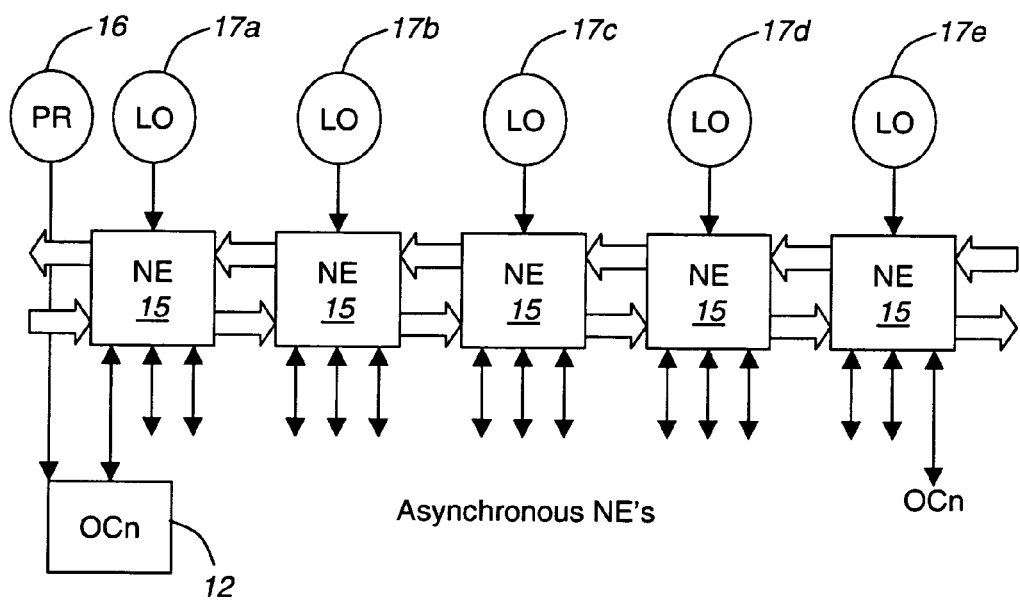

FIGS. 1a-1b illustrate synchronous and asynchronous network elements (NEs) in an exemplary network configuration. Referring to FIG. 1a, for synchronized NEs 10, the timing signal from a single primary reference (PR) 11 is distributed to all NEs 10 in the network. The PR 11 can include a bits integrated timing source (BITS) clock or similar device. This timing distribution between NEs 10 can be accomplished through external, line, and loop timing interfaces. All NEs 10 have an internal stratum-level synchronizer circuit. The stratum level specifies accuracy, jitter and wander behavior, holdover behavior, and free-run accuracy. Multiple timing inputs can be provided to allow for flexibility in timing distribution, as well as backup sources for timing protection switching. Timing aggregates of all of the NEs 10 are derived from the common PR 11. Payload 12 is adapted to the aggregate timing during the mapping/multiplexing process through byte-stuffing. Adapted payload is passed through subsequent NEs 10 with little timing adaptation, other than compensation for aggregate frame offsets.

Referring to the FIG. 1b, for asynchronous NEs 15, some or all of the NEs 15 are timed to independent asynchronous oscillators in a mix of islands of NEs timed to internal local oscillators (LOs) 17a-17e. The LOs 17a-17e do not meet stratum-level requirements. There are a wide range of free-run accuracies and random drift rates between NEs 15 which result in continuously varying jitter and wander between NEs 15. Each NE 15 aggregate is independently timed. Payload 12 is adapted to the aggregate timing during the mapping/multiplexing process through byte-stuffing at each NE 15. Adapted payload is passed through subsequent NEs 15 and is re-adapted at each NE 15 based on LO offsets, relative LO drift, and aggregate frame offsets. Ultimately, the varying jitter and wander between NEs 15 limits the reach of the network and the type of payload which can be transported.

Figure 2A:
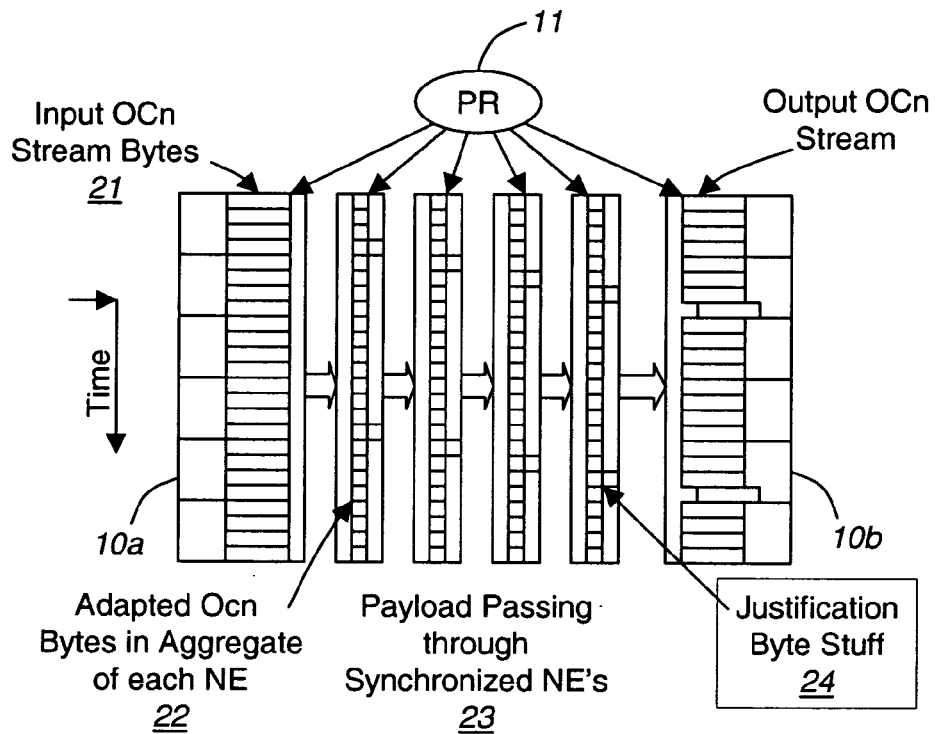
FIGS. 2a-2b illustrate mapping noise through synchronous and asynchronous network elements (NEs).
Figure 2B:
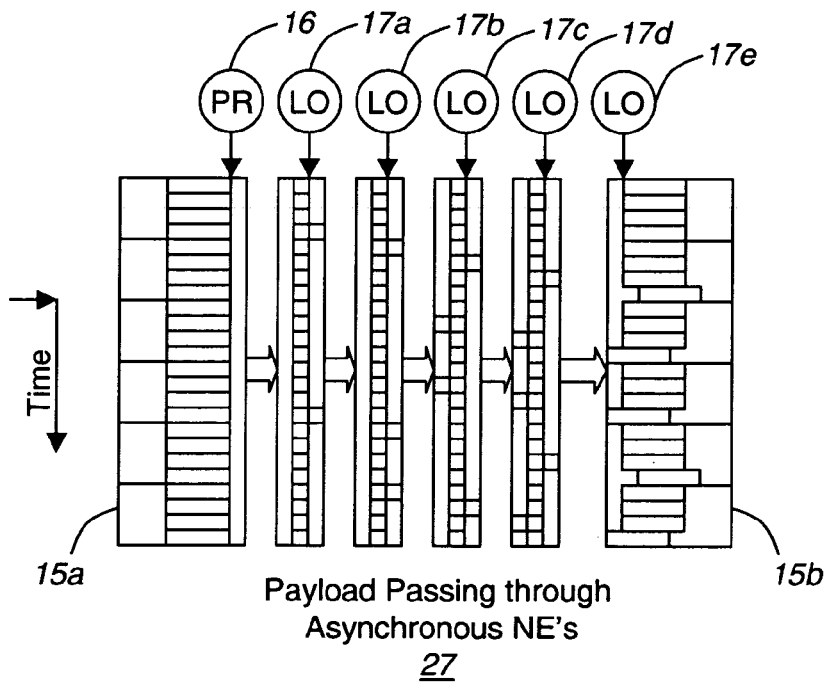

FIGS. 2a-2b illustrate mapping noise through synchronous and asynchronous NEs. Referring to the FIG. 2a, related to the mapping of noise through synchronized NEs 10a, 10b, input optical channel (OCn) byte streams 21 are adapted to the PR 11 in the first NE 10a by byte-stuffing through a justification byte stuff 24. Because the input is adapted to the PR 11, there is little additional justification in the adapted OCn bytes in aggregate of each subsequent NEs 22. Wander control minimizes additional byte-stuffing and synchronized mapping noise is low as payload passes through synchronized NEs 23. Noise from the initial NE timing adaptation is the main contributor. Noise from subsequent NEs is minimized due to very small offsets between NE clocks. Synchronized NEs minimize justification events associated with mapping thus reducing the level of mapping noise and minimize the filtering required when deriving the transmit clock for the de-mapped payload signal.

Referring to FIG. 2b, related to the mapping of noise through asynchronous NEs 15a, 15b, payload is adapted to each NE's LO 17a-17e by byte-stuffing. Additional justification is generated because each NE must adapt the payload locally as the payload passes through the asynchronous NEs 27 and previous NE byte-stuffs cause instantaneous payload rate changes requiring random byte-stuffs. Asynchronous mapping noise is high. Noise from the final NE 15b adaptation is a major contributor and each previous adaptation adds random noise due to random and drifting offsets between NEs. Synchronized networks are required by SONET/SDH to minimize payload jitter and wander. Jitter and wander noise can build up as payload is transported in a network of asynchronous NEs. Each asynchronous NE in the network produces significant numbers of justification events to adapt the payload signal from the previous NE. These justifications are uncontrolled and result in large accumulations of jitter and wander noise.

OTN does not provide for synchronization of network elements. In ITU-T Recommendation G.8251, "The Control of Jitter and Wander within the Optical Transport Network (OTN)", it states that the OTN physical layer is not required to transport network synchronization. More precisely, neither the ODUk nor any layers below it are required to transport synchronization. Further, it states that OTUk interfaces are not synchronization interfaces. G.8251 states that the transportation synchronization over SDH is adequate for OTN. In the ITU Optical Transport Network (OTN) Tutorial (available at www.itu.int/ITU-T/studygroups/com15/otn/OTNtutorial.pdf), Section 13 states that an OTN NE does not require synchronization interfaces, complex clocks with holdover mode nor SSM processing.

OTN multiplexing is limited by the ITU-T specifically excluding network synchronization between network elements (NEs). Theoretical analysis and lab testing has been performed to validate the assertion that the OTN higher rate of justification opportunities and low 8 UI per opportunity could carry SONET/SDH signals without increasing jitter and wander noise above Generic Requirements (GR) and ITU-T limits. This may be true, but as testing has confirmed, jitter and wander noise accumulate to levels above that which network operators are comfortable with. For example, the jitter generation specification limits jitter to 100 mUI pkpk and 10 mUI rms. Network operators prefer numbers below 90 mUI pkpk and 9 mUI rms. These tests are supposed to be performed with a jitter-free source, but network operators typically test over one or more spans. After several non-synchronized, concatenated OTN multiplexers, the jitter generated is over the 90 mUI pkpk and 9 mUI rms levels. When the same testing is performed over synchronized, concatenated spans, the jitter generation drops below 50 mUI pkpk and 5 mUI rms. Other, non-SONET/SDH signals, such as video transport, require even tighter jitter and wander limits.

Figure 3:
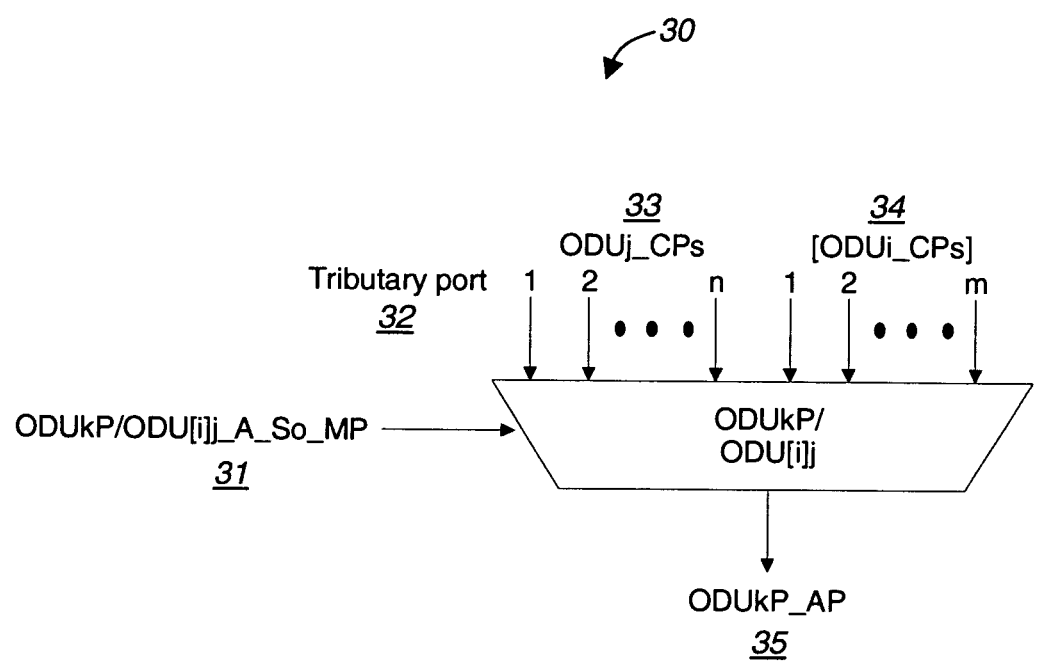
FIG. 3 illustrates the path optical data unit of level k (ODUkP) to optical data unit of level j and i (i is optional; i<j) (ODU[i]j) adaptation source function (ODUkP/ODU[i]j_A_So) in G.798 which creates the ODUk signal from a free running clock.

Referring now to FIG. 3, the path optical data unit of level k (ODUkP) to optical data unit of level j and i (i is optional; i<j) (ODU[i]j) adaptation source function (ODUkP/ODU[i]j_A_So) 30 in G.798 creates the ODUkP Access Point (ODUkP_AP) 35 signal from a free running clock. The ODUkP to ODU[i]j adaptation function 30 performs the adaptation between the ODUkP (k=2, 3) layer adapted information and the characteristic information of ODUj (j=1, 2; j<k) [and ODUi (i=1; i<j)] signals. ODU[i]j stands for optical data unit of level j and i (i is optional; i<j).

Tributary ports 32 include optical data unit of level j (ODUj) connection points (ODUj_CPs) 33 and optical data unit of level i (ODUi) connection points (ODUi_CPs) 34. ODUkP/ODU[i]j_A_So 30 asynchronously maps the ODUj_CPs 33 and ODUi_CPs 34 client signal into ODTUjk[/ik] including justification control (JC) information. The ODTUjk[/ik] are multiplexed into the payload area of the OPUk. ODUkP/ODU[i]j_A_So 30 adds OPUk Overhead (RES, PT, MSI) and default ODUk Overhead through the ODUkP/ODU[i]j_A_So_MP (management point) 31.

The ODUk is an information structure consisting of the information payload (OPUk) and ODUk related overhead. ODUk capacities for k=1, k=2, k=3 are defined. Multiplexing in the OTN domain is defined in Section 19 of G.709. Four ODU1's can be multiplexed to an ODU2. Up to sixteen ODU1's or four ODU2's can be multiplexed to an ODU3. It is possible to mix ODU1's and ODU2's in an ODU3.

Advantageously, OTN provides full transparency through encapsulation while maintaining carrier-grade performance through OTN management overhead and forward error correction. For example, a single Optical Carrier level 48/Synchronous Transport Module-16 (OC48/STM-16) signal is mapped bit-for-bit into the payload area of an Optical Channel Payload Unit 1 (OPU1), resulting in a 100% bit-transparent-OC48/STM-16 carried in the OPU1. Justification overhead is added, but when multiplexing into a higher-rate OTN signal, the locations are set to 0, indicating no justification. Overhead is added to indicate what type of payload is mapped into the OPU1. Optical Data Unit 1 (ODU1) overhead is added to provide operations, administration, maintenance, and provisioning (OAM&P). The entire ODU1 (including the OPU1 and OC-48/STM-16) is mapped into an Optical Data Tributary Unit 12 (ODTU12), providing a 100% bit-transparent carrier for the ODU1 (including the OPU1 and OC48/STM-16).

Up to four ODU1 s can be mapped into an Optical Channel Payload Unit 2 (OPU2) (~10 Gbps), and up to sixteen ODU1 s can be mapped into an Optical Channel Payload Unit 3 (OPU3) (~40 Gbps). The four tributaries are mapped into the OPU2 by byte-striping the individual ODTU12 s into the OPU2 payload area. Justification opportunities are shared among the four tributary ODTU12 s over a repeating four OPU2 frame cycle. In the first frame, one negative and up to two positive byte-stuff opportunities exist for the first tributary ODTU12. If the ODTU12 is slightly higher than the nominal rate, the negative justification opportunity in the OPU2 overhead can be used to store a payload byte. If the ODTU12 is slightly lower than the nominal rate, one or more payload bytes (positive justification opportunities) can be skipped over. The three justification overhead opportunities must be set to indicate whether a negative justification, no justification, or one or two positive justifications were performed. The second frame is used for justifying the second tributary, the third frame is used for the third tributary, and the fourth frame is used for the forth tributary, respectively. The next frame is again used for the first tributary and the process is continued on a modulo 4 basis. Multiplex signal overhead is added to the OPU2 to indicate both tributary number and the type of tributary multiplexed.

De-multiplexing is accomplished by pulling the ODU1 s out of the OPU2, keeping in mind that the tributaries were byte-stripped into the OPU2 and that the justification opportunities are shared between the tributaries on a modulo 4 basis. The individual OC48/STM-16 signals are removed bit-for-bit from the individual OPU1 payloads. Justification is interpreted by a majority vote of the three justification overhead locations in the Optical Channel Payload Unit k (OPUk). If two justification locations indicate the same justification direction, then that direction is used.

In contrast to OTN, multiplexing OC-48/STM-16 signals using SONET/SDM methodologies does not allow payload space for the Section and Line overhead, preventing 100% bit-transparency and resulting in a loss of the original independent timing. SONET/SDH justification requires a mixture of byte-stuffing (H3 and payload byte immediately following it) and pointer generation and interpretation to find the payload frame. To operate in the presence of bit errors, a justification is indicated by inverting all of the odd, or all of the even, pointer bits. If eight of the ten bits, when compared to the previous frame pointer, indicate a justification, then that justification is used, unless there was a justification that occurred less than four frames previous. Removing the payload involves reading the pointer to locate the start of the payload frame. At that point, depending on the STS/AU mapping, 1-n columns of the payload are skipped and then the payload can be removed.

Figure 4:
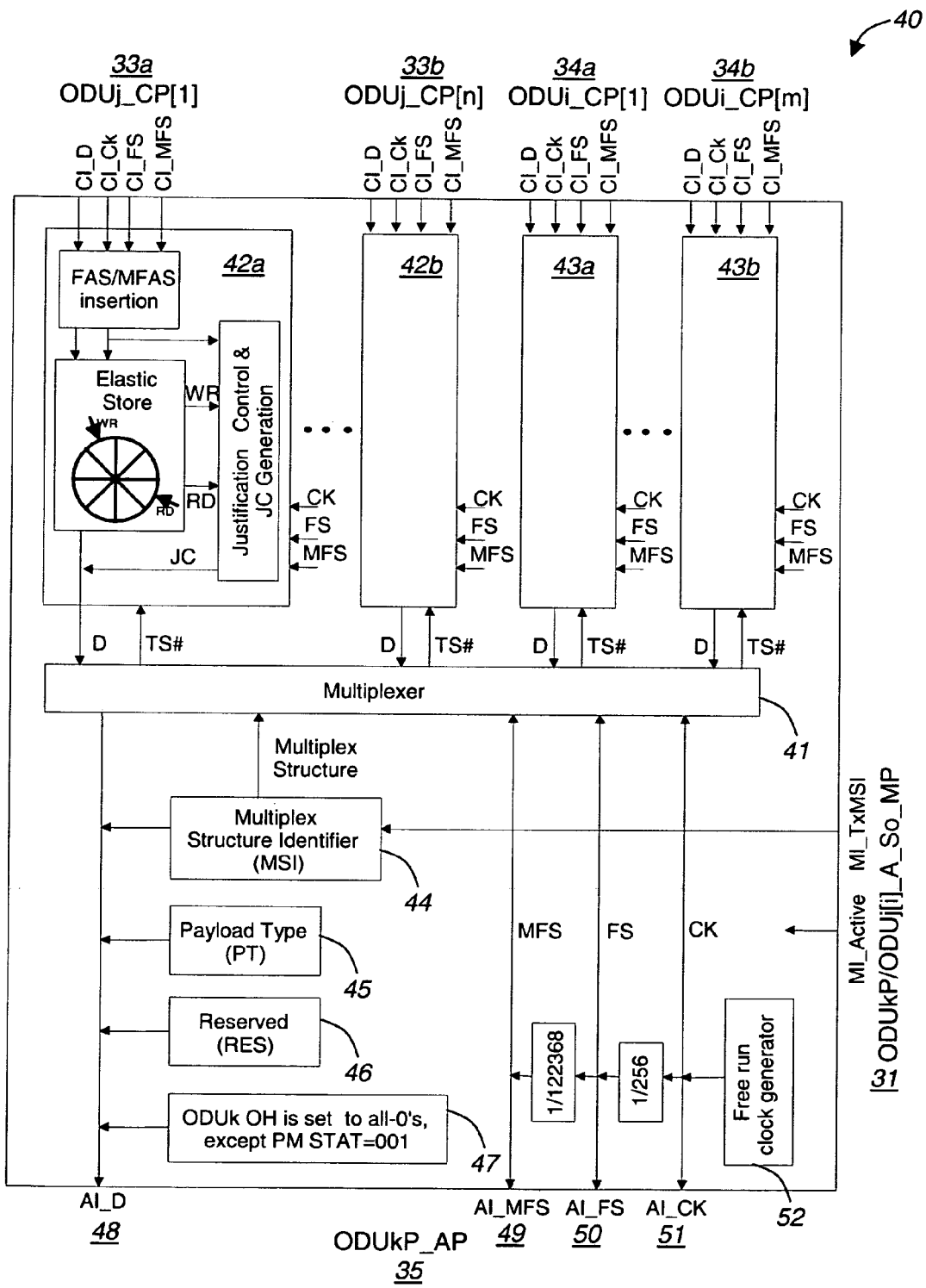
FIG. 4 illustrates the processes associated with the ODUkP/ODU[i]j_A_So function.

Referring to FIG. 4, the processes associated with the ODUkP/ODU[i]_A_So 40 function are specific processes for each ODUj_CP 33a-b, ODUi_CP 34a-b, and common processes for the compound (multiplexed) signal ODUkP_AP (access point) 35 are depicted. Each of the ODUj_CP 33a-b and ODUi_CP 34a-b include a data connection (CI_D), a clock connection (CI_Ck), a frame start connection (CI_FS), and a multi-frame start connection (CI_MFS) as inputs to the ODUkP/ODU[i]j_A_So 40 function. Each of the connections are input into frame/multi-frame alignment and justification functions 42a-b, 43a-b.

The frame/multi-frame alignment and justification functions 42a-b, 43a-b extend the ODUj_CP 33a-b, ODUi_CP 34a-b with the frame alignment overhead (FAS and MFAS) as described in ITU-T G.709/Y.1331. The Mapping, frequency justification and bit rate adaptation functions provide an elastic store (buffer) process for the ODUj_CP 33a-b, ODUi_CP 34a-b client signals. The data signal ODUj[/i]_CI is written into the buffer under control of the associated input clock. The data is read out of the buffer and written onto the D, NJO, PJO1 and PJO2 bytes of the selected ODTUjk[/ik] frame under control of the ODUk clock and justification decisions as defined in 19.5/G.709/Y.1331.

A justification decision is performed every fourth frame for the ODTU12, every sixteenth frame for the ODTU13 and four times every sixteen frames for the ODTU23. Each justification decision results in a corresponding double positive, positive, negative or no justification action. Upon a double positive justification action, the reading of 2 data bytes out of the buffer is cancelled once. No ODUj[/i] data shall be written onto the PJO2, PJO1 and NJO byte. Upon a positive justification action, the reading of 1 data byte out of the buffer is cancelled once. No ODUj[/i] data shall be written onto the PJO1 and NJO byte and data shall be written onto the PJO2 byte. Upon a negative justification action, 1 extra data byte shall be read once out of the buffer. ODUj[/i] data shall be written onto the PJO2, PJO1 and NJO byte. If no justification action is to be performed, ODUj[/i] data is written onto the PJO2 and PJO1 byte and no ODUj[/i] data shall be written onto the NJO byte. The ODUk frame that contains the PJO2, PJO1 and NJO bytes depends on the time slot[s] of the ODTUjk[/ik].

The frame/multi-frame alignment and justification functions 42a-b, 43a-b output to a multiplexer 41. The multiplexer 41 function assigns the individual ODTUjk[/ik] to specific times slots of the OPUk payload area as defined by the multiplex structure (see 19.3 and 19.4.1 in ITU-T Rec. G.709/Y.1331). The multiplex structure identifier (MSI) 44 function inserts the TxMSI into the MSI byte positions of the PSI overhead as defined in 19.4/G.709/Y.1331. The TxMSI value and as such the multiplex structure is either fixed or configurable via MI_TxMSI. The payload type (PT) 45 function inserts code "0010 0000" (ODU multiplex structure) into the PT byte position of the PSI overhead as defined in 15.9.2.1/G.709/Y.1331. The reserved (RES) 46 function inserts all-0's into the RES bytes. In function 47 all other bits of the ODUk overhead are sourced as "0"s, except the ODUk-PM STAT field which should be set to the value "normal path signal" (001). The adapted information data (AI_D) 48 connection outputs the results of the multiplexing of the ODTUjk[/ik] from all of the functions 41, 44, 45, 46, 47.

The ODUkP/ODU[i]j_A_So 40 function also includes adapted information for multi-frame start (AI_MFS) 49, adapted information for frame start (AI_FS) 50, and adapted information for a clock (AI_CK) 51. The AI_MFS 49 and AI_FS 50 functions generate the (multi) frame start reference signals AI_FS 49 and AI_MFS 50 for the ODUk signal. The AI_FS 50 signal shall be active once per 122368 clock cycles. AI_MFS 49 shall be active once every 256 frames.

The AI_CK 51 function generates a local ODUk clock (ODUkP_AI_CK) of "239/(239−k)*4(k−1)*2 488 320 kHz +/−20 ppm" from a free running clock generator 52. The clock parameters, including jitter and wander requirements, as defined in Annex A/G.8251 (ODCa clock) apply. As discussed herein, the free running clock generator 52 does not support external synchronization, stratum levels, SSM, or holdover modes.

Figure 5:
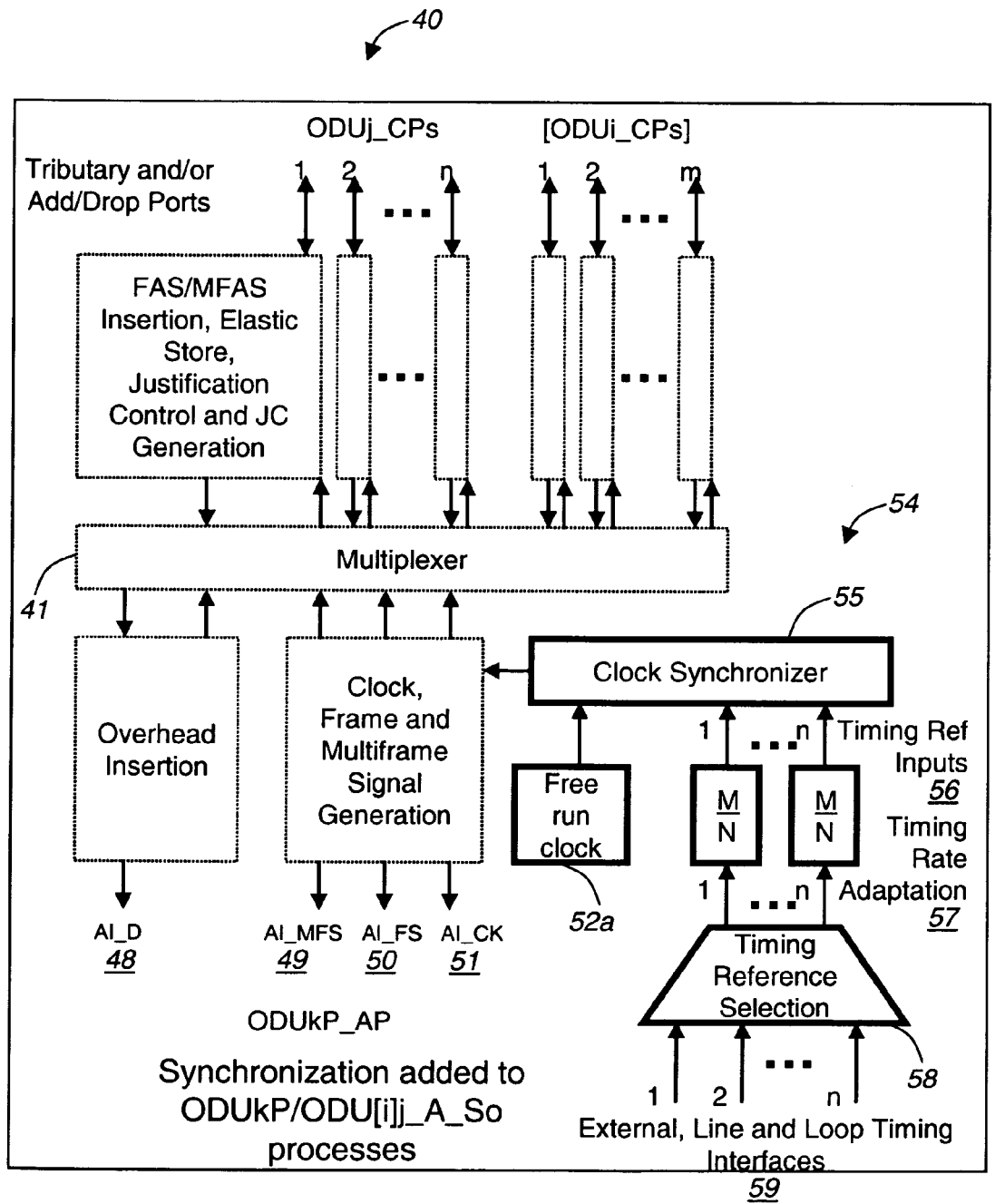
FIG. 5 illustrates an exemplary embodiment of the present invention for adding external synchronization to the OTN ODUkP to ODU[i]j adaptation source process, ODUkP/ODU[i]j_A_So.

Referring to FIG. 5, in an exemplary embodiment of the present invention, external synchronization is added to the OTN ODUkP to ODU[i]j adaptation source process, ODUkP/ODU[i]j_A_So 40. FIG. 5 illustrates the ODUkP/ODU[i]j_A_So 40 function depicted in FIG. 4 with the free running clock generator 52 replaced with a clock synchronizer subsystem 54. The clock synchronizer subsystem 54 includes a free run clock 52a; external, line, and loop timing interfaces 59; timing reference selection 58; timing rate adaptation 57 circuits; timing reference inputs 56; and a clock synchronizer 55. The clock synchronizer subsystem 54 can support wander control, holdover, 1-n timing reference inputs with a frequency qualification circuit, free run input, and automatic reference switching.

The present invention adds the clock synchronizer subsystem 54 in place of the free run clock generator 52 in the ODUkP/ODU[i]j_A_So 40 function with the existing functionality in ODUkP/ODU[i]j_A_So 40 remaining. Additionally, the clock synchronizer subsystem 54 can be added in place of a free run clock generator in other OTN adaptation functions to provide synchronization.

The external, line, and loop timing interfaces 59 are input into the timing reference selection 58 circuit. The external, line, and loop timing interfaces 59 can include, for example, a local external timing source such as an atomic Cesium clock or a satellite-derived clock, line-derived timing by monitoring synch status bytes to ensure quality, or loop timing from other network elements. In the case of external timing, example reference sources include E1 or DS1 signals from a building integrated timing source (BITS) clock. The timing reference selection 58 circuit is configured to select one of the external, line, and loop timing interfaces 59 for input into the clock synchronizer 55. The timing rate adaptation 57 circuit is provisionable to multiply by M and divide by N to adapt line and loop timing signals to an SDH or SONET timing reference. The clock synchronizer 55 outputs a clock signal to the AI_CK 51, AI_FS 50, AI_MFS 49 from FIG. 4.

Advantageously, externally-synchronized generation of an OTUkV signal provides less jitter and wander build-up through a network of OTN multiplexers providing increased noise margins of transported signals and payloads. Stratum level synchronization provides a standards-based synchronization approach that has been tested and verified in existing SONET/SDH transport networks. Rate adapters to provide m/n scaling of OTUk[V] signals to rates common in SONET/SDH-style synchronizers provides line and loop distribution of timing through OTUk[V] signals. Choice of external synchronization sources, including BITS, Line, and Loop timing sources, provides flexibility in synchronization distribution network design. Multiple references and automated timing protection switching provide redundancy in timing references to allow reliable operation in the presence of timing network faults. Synchronization functions integrated with the multiplexer circuit pack allows multiplexers to offer synchronization functionality without burdening remaining circuit packs with unnecessary functionality. Synchronization on a per-NE basis allows many multiplexers to share a common synchronization function, reducing the costs per multiplexer when compared to integrating the synchronization functionality on each multiplexer.

Figure 6:
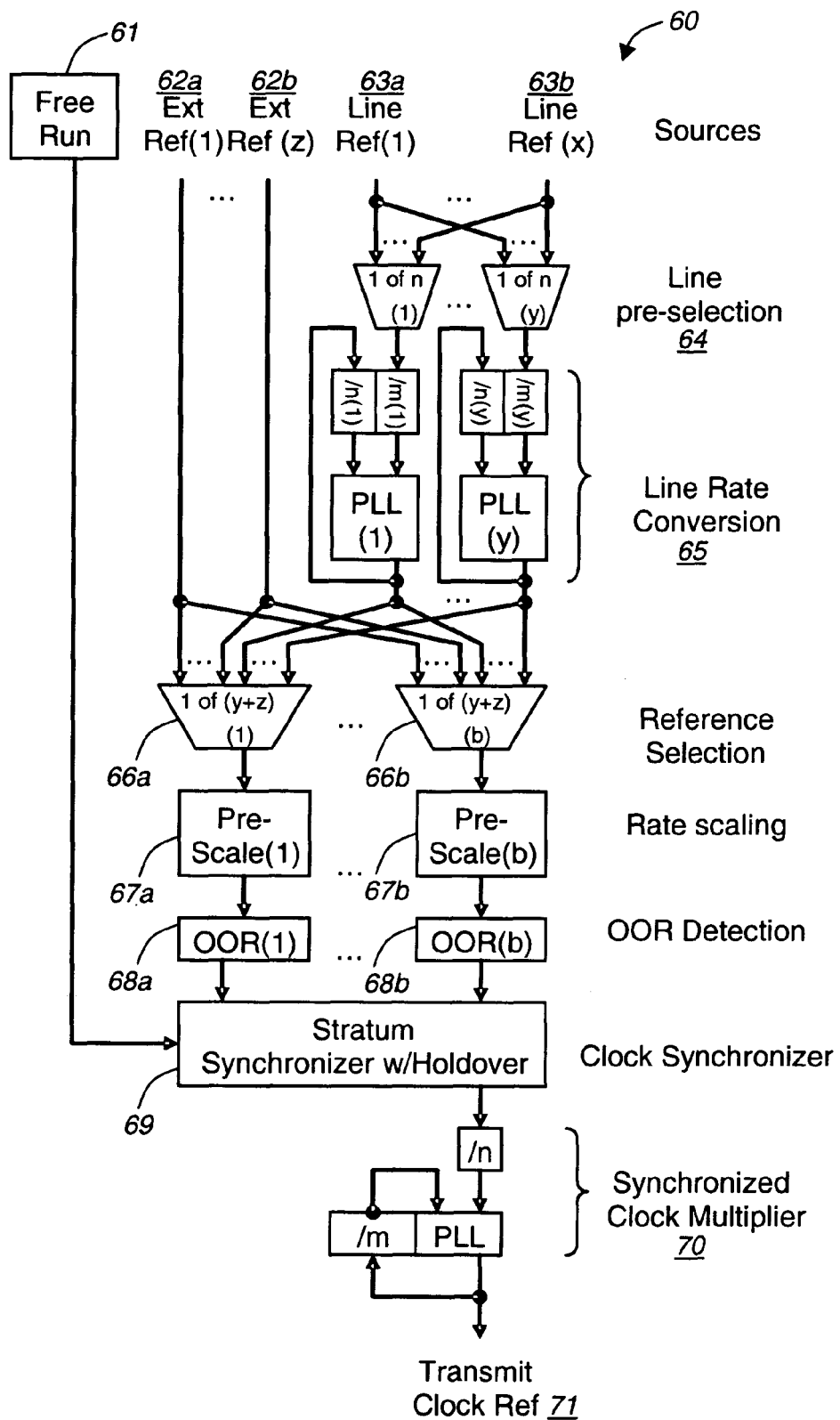
FIG. 6 illustrates an exemplary embodiment of a synchronized transmit clock reference generation circuit of the present invention.

Referring to FIG. 6, an exemplary embodiment of a synchronized transmit clock reference generation circuit 60 is depicted. The inputs to the clock reference generation circuit 60 include a free run 61 clock, one or more external references 62a-b, and one or more line references 63a-b. The external references 62a-b can include external inputs such as a BITS clock signal, an E1, etc. The line references 63a-b can include line inputs such as an OC-N, STM-N, and OTUk[V]. The clock reference generation circuit 60 is included in an externally synchronized OTN multiplexer as a replacement for a free run clock generator.

The line references 63a-b are pre-selected by a line pre-selection 64 circuit prior to line rate conversion. A line rate conversion 65 circuit performs n/m rate conversion when OTUk[V] signals are used for line references to provide inputs compatible with standard stratum synchronization circuits. A reference selection 66a-b circuit selects one or more timing sources as reference(s) to a stratum synchronizer 69.

After the reference selection 66*a*-*b*, a pre-scaling 67*a*-*b* circuit provides further scaling to convert reference source rates if required to rates compatible with standard stratum synchronization circuits. After the pre-scaling 67*a*-*b* circuit, an out-of-range (OOR) detection circuit 68*a*-*b* is provided to detect degraded and failed timing references. The output of the OOR 68*a*-*b* circuit is to the stratum synchronizer 69.

The stratum synchronizer 69 generates an output clock synchronous with the active timing reference source on the input. This output clock meets stratum requirements for wander and jitter. The stratum synchronizer 69 uses selected source status, OOR status, provisioning and internal fault detection to select active reference. This meets stratum requirements for clock switching. Further, the stratum synchronizer 69 provides holder functionality when all reference sources fail and provides free run 61 functionality when provisioned or when all reference sources fail and holdover cannot be used. The stratum synchronizer 69 outputs to a synchronized clock multiplier 70 which multiples the output to an appropriate rate for use as an OTUk[V] transmit clock. Finally, a transmit clock reference 71 is used to replace the free run clock in the various OTN adaptation functions such as the OTN ODUkP to ODU[i] adaptation source process, ODUkP/ODU[i]j_A_So.

Figure 7:
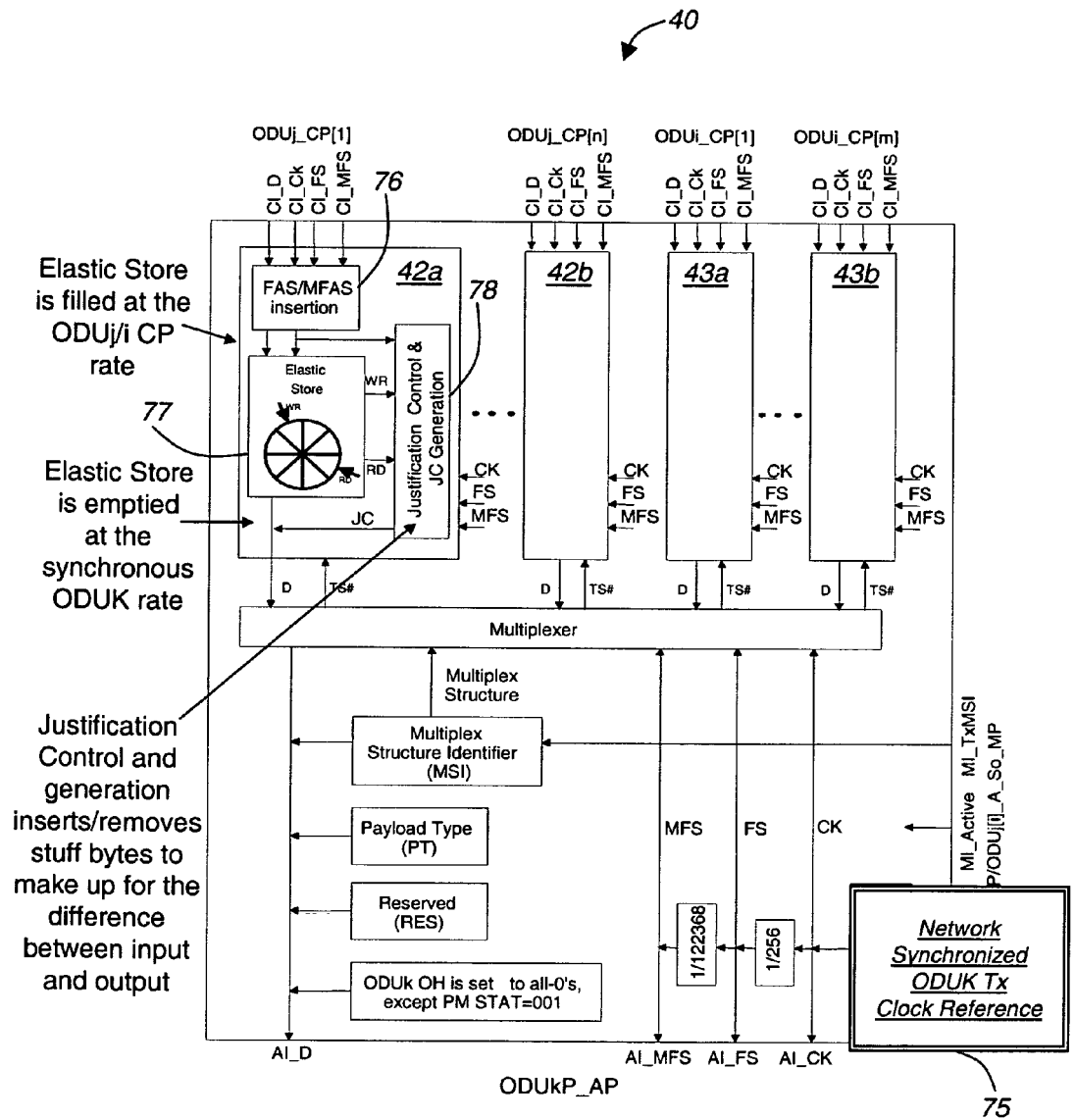
FIG. 7 illustrates an exemplary embodiment of network synchronized multiplexing utilizes a network synchronized ODUk Tx clock reference in place of a free-run clock in the ODUkP/ODU[i]j_A_So process to generate the ODUk frame.

Referring to FIG. 7, an exemplary embodiment of network synchronized multiplexing utilizes a network synchronized ODUk Tx clock reference 75 in place of a free-run clock in the ODUkP/ODU[i]j_A_So process 40 to generate the ODUk frame. As described herein, the clock reference 75 can be divided/multiplied to achieve the correct ODUk rate. Each of the frame/multi-frame alignment (FAS/MFAS) and justification functions 42*a*-*b*, 43*a*-*b* include a FAS/MFAS insertion function 76 followed by an elastic store 77 connected to a justification control and JC generation function 78. The elastic store 77 includes read/write functionality to accept incoming ODUj_CP and ODUi_CP signals at the ODUi/j CP rate. The elastic store 77 is emptied at the synchronous ODUk rate. The justification control and generation 78 inserts or removes stuff bytes to make up for differences between the rate of the input and output.

In regards to network synchronized multiplexing, an ODUk frame is generated with the network synchronized ODUk Tx clock reference 75. The ODU[i]j tributaries at the connection points (CPs) 42*a*-*b*, 43*a*-*b* are adapted into a network synchronized frame by the ODUkP_ODU[i]j_A_So process 40. In regards to network synchronized multiplexing for a regenerator, the tributaries on the CPs 42*a*-*b*, 43*a*-*b* are de-multiplexed from the received ODUk and then multiplexed into a network synchronized ODUk frame. One way multiplexer-regenerator performs synchronization in one direction. Bi-directional multiplexer-regenerator contains two synchronization circuits to perform synchronization in two directions at a common location. N-directional multiplexer-regenerator contains N synchronization circuits to perform synchronization in N directions at a common location. NxBi-directional multiplexer-regenerator contains 2xN synchronization circuits to perform synchronization in 2xN directions at a common location.

Figure 8:
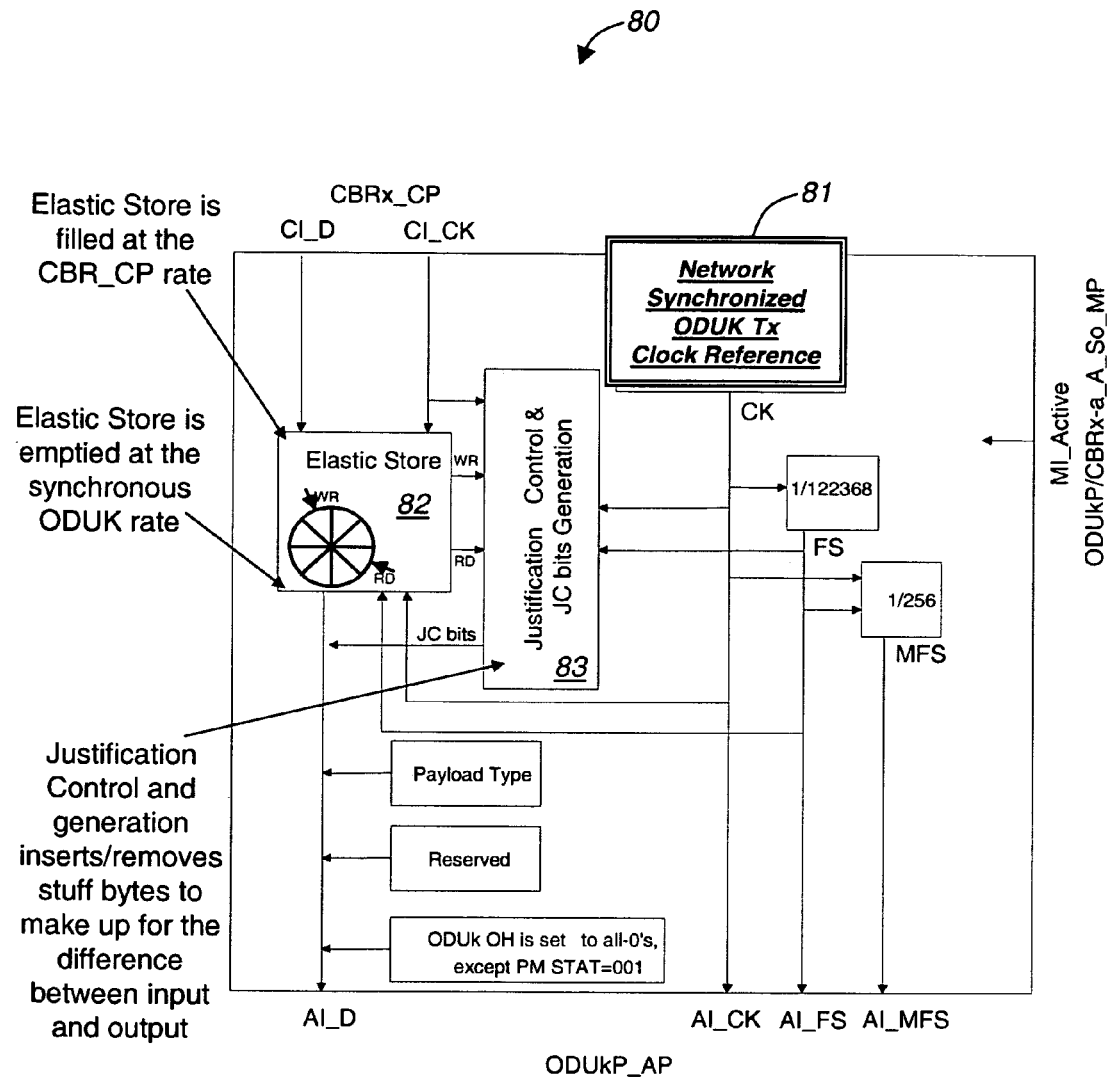
FIG. 8 illustrates an exemplary embodiment of network synchronized asynchronous multiplexing utilizes a network synchronized ODUk Tx clock reference in place of a free-run clock in the ODUkP/CBRx-a_A_So (ODUkP to constant bit rate signal of rate x (CBRx) adaptation source) process to generate the ODUk frame.

Referring to FIG. 8, an exemplary embodiment of network synchronized asynchronous multiplexing utilizes a network synchronized ODUk Tx clock reference 81 in place of a free-run clock in the ODUkP/CBRx-a_A_So (ODUkP to constant bit rate signal of rate x (CBRx) adaptation source) process 80 to generate the ODUk frame. As described herein, the clock reference 81 can be divided/multiplied to achieve the correct ODUk rate. FIG. 8 illustrate the ODUkP/CBRx-a_A_So process 80 as an example, but any of the standard, or non-standard asynchronous mappings could be used with the present invention.

An elastic store 82 includes read/write functionality to accept incoming CBRx_CP signals at the CBR_CP rate. The elastic store 82 is emptied at the synchronous ODUk rate referenced to the network synchronized ODUk Tx clock reference 81. A justification control and JC bits generation circuit 83 connects to the elastic store and is configured to insert/remove stuff bytes to make up for the difference between the rate at the input and output.

In regards to a network synchronized transponder, the ODUk frame is generated with the network synchronized clock reference 81. In regards to a network synchronized regenerator, the ODUk frame is generated with the network synchronized clock reference 81 with payload being de-mapped from the received ODUk and then mapped into a network synchronized ODUk frame. One way multiplexer-regenerator performs synchronization in one direction. Bi-directional multiplexer-regenerator contains two synchronization circuits to perform synchronization in two directions at a common location. N-directional multiplexer-regenerator contains N synchronization circuits to perform synchronization in N directions at a common location. NxBi-directional multiplexer-regenerator contains 2xN synchronization circuits to perform synchronization in 2xN directions at a common location.

Figure 9:
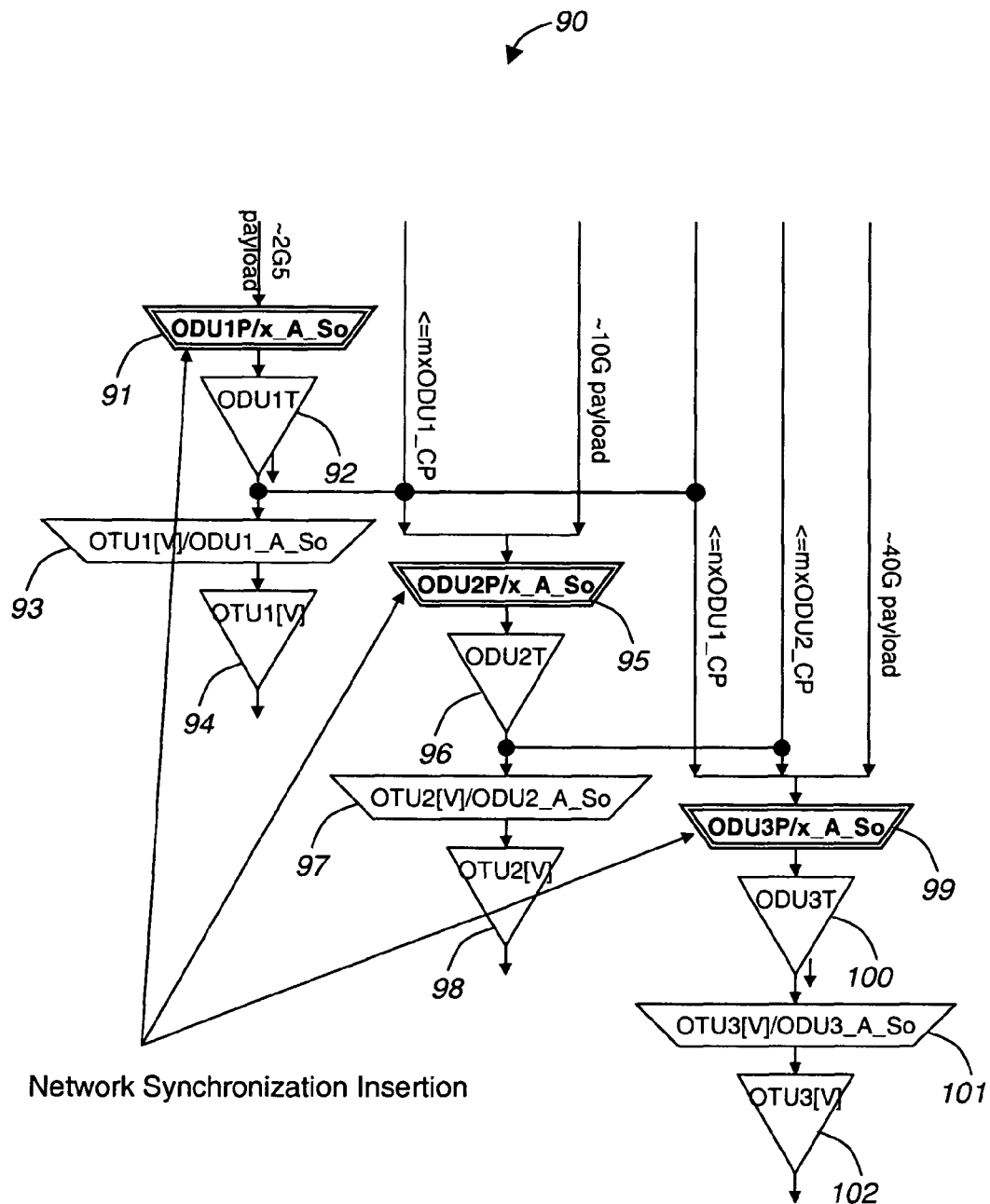
FIG. 9 illustrates possible locations for network synchronization insertion in the OTN ODUk and OTUk source functions according to an exemplary embodiment of the present invention.

Referring to FIG. 9, OTN ODUk and OTUk source functions 90 illustrate possible locations for network synchronization insertion according to an exemplary embodiment of the present invention. ODUkP/x_A_So adaptation functions 91, 95, 99 are modified to include external synchronization to generate synchronized ODUk frames. ODU1 asynchronous adaptation function (ODU1P/x_A_So) 91 maps payloads of up to 2.5 Gbps into a path optical data unit of level 1 (ODU1P) access point (ODU1P_AP) which in turn is mapped into an ODU1 termination connection point (ODU1_TCP) by an ODU1 termination source process (ODU1T) 92. OTU1 to ODU1 adaptation function (OTU1[V]/ODU1_A_So) 93 maps the ODU1_TCP into an OTU1 access point (OTU1_AP) which is mapped into an OTU1 termination connection point (OTU1_TCP) by an OTU1V termination source process (OTU1[V]) 94.

ODU2 asynchronous adaptation function (ODU2P/x_A_So) 95 maps payloads of up to 10 Gbps (i.e., up to four ODU 192 signals or one 10 Gbps payload) into a path optical data unit of level 2 (ODU2P) access point (ODU2P_AP) which in turn is mapped into an ODU2 termination connection point (ODU2_TCP) by an ODU2 termination source process (ODU2T) 96. OTU2 to ODU2 adaptation function (OTU2[V]/ODU2_A_So) 97 maps the ODU2_TCP into an OTU2 access point (OTU2_AP) which is mapped into an OTU2 termination connection point (OTU2_TCP) by an OTU2V termination source process (OTU2[V]) 98.

ODU3 asynchronous adaptation function (ODU3P/x_A_So) 99 maps payloads of up to 40 Gbps (i.e., a combination of nxODU1_CP (connection points) and mxODU2_CP (connection points), or one 40 Gbps payload) into a path optical data unit of level 3 (ODU3P) access point (ODU3P_AP) which in turn is mapped into an ODU3 termination connection point (ODU3_TCP) by an ODU3 termination source process (ODU3T) 100. OTU3 to ODU3 adaptation function (OTU3[V]/ODU3_A_So) 101 maps the ODU3_TCP into an OTU3 access point (OTU3_AP) which is mapped into an OTU3 termination connection point (OTU3_TCP) by an OTU3[V] termination source process (OTU3V) 102.

According to an exemplary embodiment of the present invention, external network synchronization is added in any one of the ODUkP/x_A_So adaptation functions 91, 95, 99 to generate synchronized ODUk frames. The ODUkP/x_A_So adaptation functions 91, 95, 99 can be used to generate network synchronized ODUk signals if the input payload signal is network synchronized. Further, non-standard ODUk adaptation functions, frame sizes, and frame rates can be used to map payloads and multiplex signals.

In the present invention, network synchronization can be added at any ODUk adaptation function 91, 95, 99, and in the case of multiplexers, at more than one ODUk adaptation function 91, 95, 99. The network synchronization can be sourced from external signal inputs (e.g., BITS, DS1, E1); line signal inputs (e.g., OC-m, STM-n, OTUkV); through timing at transponders and regenerators; holdover during synchronization source faults; and free run during synchronization source faults, maintenance periods, or when no timing source is available.

Of note, the present invention utilizes standard OTN sink functions with externally synchronized source functions. The OTN sink functions are unaffected by the external synchronization. Further, the present invention utilizes standard ODUk termination functions and standard OTUk functions which are unaffected by the external synchronization.

Figures 10A, 10B, 10C:
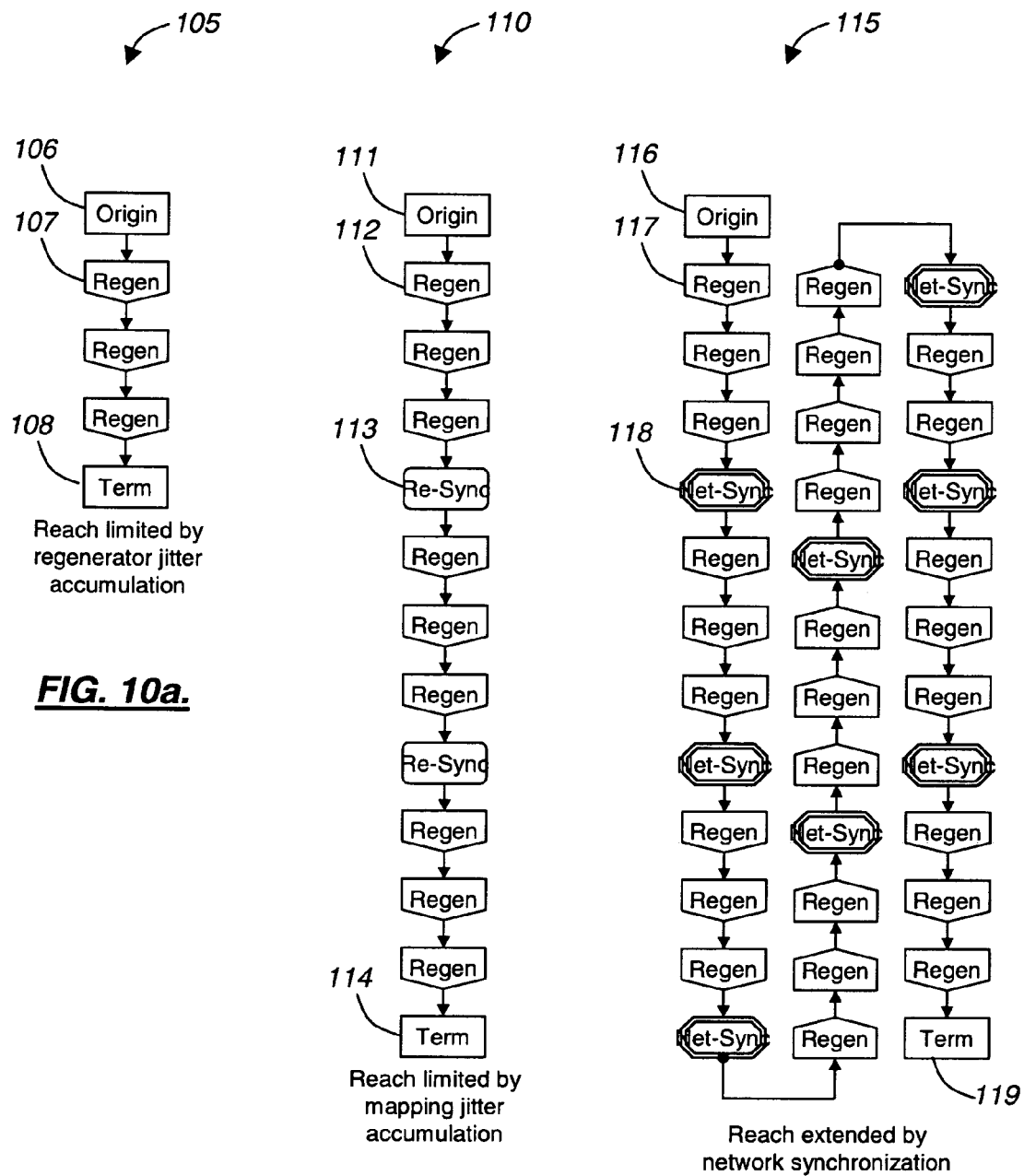
FIGS. 10a-10c illustrate OTN regenerated transport systems for extending the reach of dense wave division multiplexed (DWDM) transport systems by performing optical to electrical to optical (O-E-O) regeneration along the transmission path.

Referring to FIGS. 10a-10c, regenerated OTN transport systems 105, 110, 115 extend the reach of dense wave division multiplexed (DWDM) transport systems by performing optical to electrical to optical (O-E-O) regeneration along the transmission path. In FIG. 10a, the regenerated OTN transport system 105 includes an origin node 106 where DWDM signals are transmitted, several regenerator nodes 107 where DWDM signals are regenerated, and a terminal node 108 where the DWDM signals are received. Additional regenerators 107 can be added along the path to extend the reach farther of the DWDM signals. However, as a signal passes through regenerators, a slight amount of jitter is added to the signal. The jitter degrades the signal slightly and if the signal is passed through too many regenerators, the signal can be degraded too much or become unusable. Jitter accumulation builds up especially quickly when many regenerator circuits are placed close to each other in highly integrated packages in an effort to reduce the cost of the overall regenerator. In a regenerator-based transport system as depicted in the regenerated OTN transport system 105, the jitter accumulation limits the maximum reach of the system.

In FIG. 10b, the regenerator OTN transport system 110 includes an origin node 111 where DWDM signals are transmitted, several regenerator nodes 112 where DWDM signals are regenerated, re-synchronized nodes 1113 to remove accumulated jitter, and a terminal node 114 where the DWDM signals are received. The re-synchronized nodes 113 are placed after a span of regenerators 112 to remove accumulated jitter to allow the reach to be extended further through additional spans of regenerators 112. However, re-synchronization adds mapping noise. In an ultra-long haul system consisting of many regenerator 112 spans and re-synchronized nodes 113, mapping jitter can build up quickly to unacceptable levels limiting the overall reach of the regenerator OTN transport system 110.

In FIG. 10c, the regenerator OTN transport system 115 includes an embodiment of the present invention to provide network synchronization in regards to OTN multiplexed DWDM systems. Regenerator OTN transport system 115 includes an origin node 116 where DWDM signals are transmitted, several regenerator nodes 117 where DWDM signals are regenerated, re-synchronized nodes 118 to remove accumulated jitter, and a terminal node 119 where the DWDM signals are received. The re-synchronized nodes 118 use common network timing according to an embodiment of the present invention to reduce mapping jitter build up to extend the reach even further than regenerator OTN transport system 110.

Figure 11A:
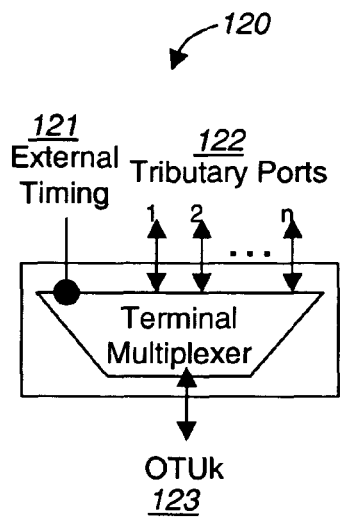
FIGS. 11a-11c illustrate different OTN network element (NE) types such as terminal multiplexers, add/drop multiplexers, and multi-service NEs utilizing externally synchronized OTN multiplexing.
Figure 11B:
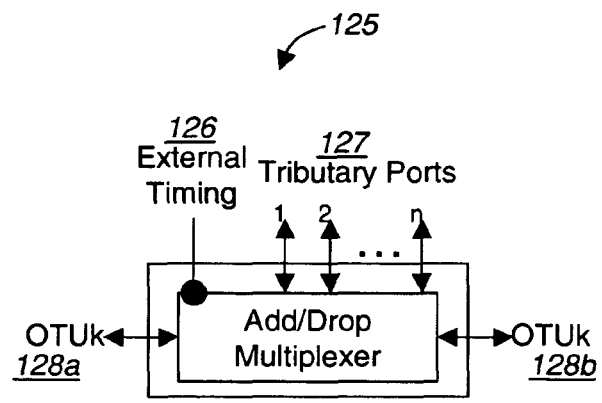
Figure 11C:
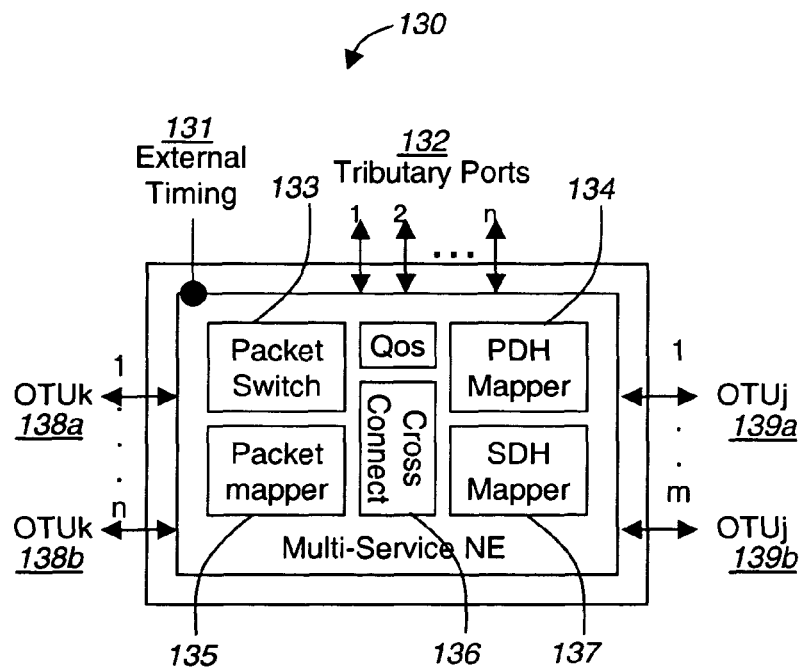

Referring to FIGS. 11a-11c, synchronized OTN multiplexing can enhance the functionality of different OTN NE types such as terminal multiplexers, add/drop multiplexers, and multi-service NEs. In FIG. 11a, a terminal multiplexer 120 includes multiple tributary ports 122 which are multiplexed into an OTUk 123 signal. The terminal multiplexer 120 includes external timing 121 according to the present invention. The tributary ports 122 can include OC-48, STM-16, OC-192, and STM-64 signals which are multiplexed using OTN multiplexing to OTU2 or OTU3 signals. The OTN multiplexing in the terminal multiplexer 120 can occur within a multiplexer circuit pack, a tributary circuit pack, or another circuit pack such as a switch matrix. Example embodiments of the terminal multiplexer 120 include the CoreStream/RLS T-MUXCVR and the CN4200 MainX and F10A, all available from CIENA Corporation of Linthicum, Md.

In FIG. 11b, an add-drop multiplexer (ADM) 125 includes multiple tributary ports 127 and an east OTUk 128a and a west OTUk 128b output. The ADM 125 is configured to multiplex the tributary ports 127 to and from both OTUk 128a-b directions. The ADM 125 includes external timing 126 according to the present invention. The tributary ports 127 can include OC-48, STM-16, OC-192, and STM-64 signals which are multiplexed using OTN multiplexing to OTU2 or OTU3 signals. The OTN multiplexing in the ADM 125 can occur within a multiplexer circuit pack, a tributary circuit pack, or another circuit pack such as a switch matrix.

In FIG. 11c, a multi-service NE 130 includes multiple tributary ports 132, multiple outputs OTUk 138a-b, and multiple outputs OTUj 139a-b. The multi-service NE 130 also can include a packet switch 133, packet mapper 135, cross-connect 136 matrix, SDH mapper 137, and PDH mapper 134. The multi-service NE 130 is configured to be a multi-service, multi-protocol switching system that consolidates the functionality of a multi-service switching platform (MSPP), digital cross-connect (DCS), Ethernet switch, and OTN switch in a single, high-capacity switching system. The multi-service NE 130 includes external timing 131 according to the present invention. The OTN multiplexing in the multi-service NE 130 can occur within a multiplexer circuit pack, a tributary circuit pack, the cross-connect 136, the SDH mapper 137, or another circuit pack.

The tributary ports 132 can include signals such as OC-48, STM-16, OC-192, and STM-64 signals which are multiplexed using OTN multiplexing to OTU2 or OTU3 signals which are in turn sent to the cross-connect 136 and mapped to the OTUk,j 138a-b, 139a-b outputs. An example embodiment of the multi-service NE 130 is the CoreDirector available from CIENA Corporation of Linthicum, Md.

Utilizing the present invention of external synchronization OTN multiplexing, client tributary ports 122, 127, 132 can be directly mapped into the ODUj[/i]. Clients can include OTU1, OTU2, CBR2G5, Ethernet, and custom mappings. Additionally, clients can be mapped into other protocols before being mapped into the ODUj[/i] such as, for example, data ports mapped into generic framing protocol (GFP) then into the ODUj[/i], asynchronous transfer mode (ATM) extracted from a client then mapped into ODUj[/i], and multiplexing of virtually concatenated clients.

Figure 12A:
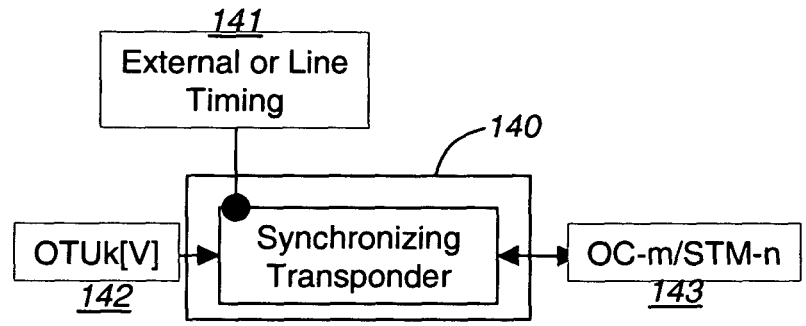
FIGS. 12a-12c illustrate an OTN transponder and an OTN regenerator utilizing synchronized OTN multiplexing.
Figure 12B:
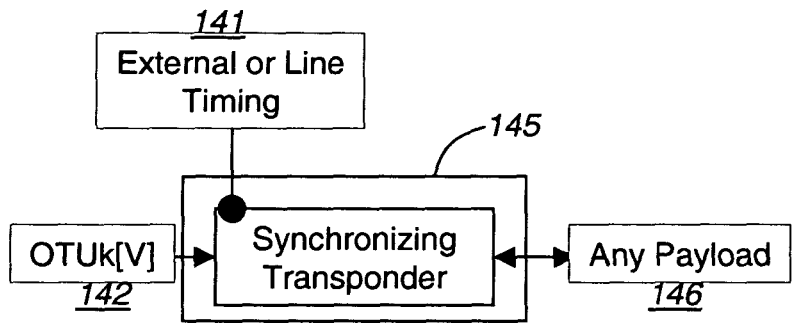
Figure 12C:
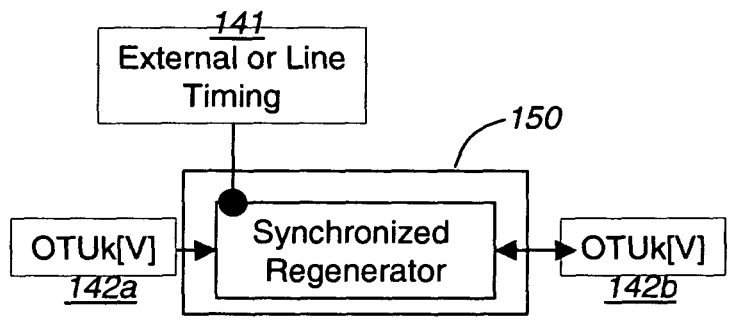

Referring to FIGS. 12a-12c, synchronized OTN multiplexing of the present invention can enhance the functionality of OTN transponders 140, 145 and OTN regenerators 150. In FIG. 12*a*, the OTN transponder 140 includes an OC-m/STM-n 143 input, external or line timing 141, and an OTUk[V] output 142. The OC-m/STM-n 143 input payloads are asynchronously mapped into a synchronized OTUk[V] frame. For example, OC-48/STM-16 are mapped into an OTU1[V], OC-192/STM-64 are mapped into an OTU2[V], and OC-768/STM-256 are mapped into an OTU3[V]. In FIG. 12*b*, the OTN transponder 145 includes an input 146 which can be any payload, external or line timing 141, and an OTUk[V] output 142. Here, the input 146 can include any standard or non-standard payload signal/frame mapped into standard or non-standard rate OTUk[V] frames.

In FIG. 12*c*, the OTN regenerator 150 includes an OTUk[V] input 142*a*, an OTUk[V] output 142*b*, and external or line timing 141. The OTN regenerator 150 de-maps payload received from the OTUk[V] input 142*a* and re-maps it into a synchronized OTUk[V] output 142*b*. For example, an OTU1[V] can be de-mapped into an OC-48/STM-16 and then re-mapped into an OTU1[V], an OTU2[V] can be de-mapped into an OC-192/STM-64 and then re-mapped into an OTU2[V], and an OTU3[V] can be de-mapped into an OC-768/STM-256 and then re-mapped into an OTU3[V]. Further, any standard or non-standard payload signal/frame can be de-mapped from a standard or non-standard rate OTUk[V] frame and mapped into standard or non-standard rate OTUk[V] frames.

Of note, OTN multiplexing is defined in: ITU-T G.709 Interfaces for the optical transport network (OTN); ITU-T G.798 Characteristics of optical transport network hierarchy equipment functional blocks; OTN Standard FEC (Called GFEC sometimes) is defined in "ITU-T G.975"; OTN Jitter is defined in "ITU-T G.8251: The control of jitter and wander within the optical transport network (OTN)"; G.870: Terms and definitions for Optical Transport Networks (OTN); G.871: Framework for optical transport network Recommendations; G.873.1: Optical Transport Network (OTN): Linear protection; G.874: Management aspects of the optical transport network element; G.874.1: Optical transport network (OTN): Protocol-neutral management information model for the network element view; G.959.1: Optical transport network physical layer interfaces; G.8201: Error performance parameters and objectives for multi-operator international paths within the Optical Transport Network (OTN). In addition to the OTN Standard FEC (GFEC), a proprietary FEC could be used.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An externally synchronized optical transport network (OTN) network element comprising:
   circuitry configured to generate a completely standardized or functionally standardized optical transmission unit of level k (OTUk[V]); and
   a clock synchronizer subsystem connected to the circuitry, wherein the clock synchronizer subsystem is configured to generate an output clock synchronous with an active external timing reference separate from a line timing reference and generated externally from the network element, and wherein the clock synchronizer subsystem is integrated within OTN adaptation source processes providing external timing within the OTN adaptation source processes for OTN multiplexing;
   wherein the circuitry is configured to de-map payload from a received optical data unit of level k (ODUk) and then re-map into a network synchronized ODUk utilizing the output clock synchronous with the active external timing reference.

2. The externally synchronized OTN network element of claim 1, wherein the active timing reference is selected from input sources to the clock synchronizer subsystem.

3. The externally synchronized OTN network element of claim 2, wherein the clock synchronizer subsystem comprises an out-of-range detector configured to detect degraded or failed input sources.

4. The externally synchronized OTN network element of claim 2, wherein the clock synchronizer subsystem comprises holdover functionality when all input sources fail.

5. The externally synchronized OTN network element of claim 4, wherein the clock synchronizer subsystem comprises free run functionality, wherein the free run functionality comprises a free run oscillator which is provisioned as the active timing reference when provisioned and when all input sources fail and holdover cannot be used.

6. The externally synchronized OTN network element of claim 1, wherein the circuitry comprises:
   a path optical data unit of level 1 (ODU1P) adaptation source process configured to map payloads up to 2.5 Gbps into a path optical data unit of level 1 access point (ODU1P_AP); and
   an optical data unit of level 1 (ODU1) termination source process configured to map an ODU1P_AP into an optical data unit of level 1 termination connection point (ODU1_TCP).

7. The externally synchronized OTN network element of claim 1, wherein the circuitry comprises:
   a path optical data unit of level 2 (ODU2P) adaptation source process configured to map payloads up to 10 Gbps into a path optical data unit of level 2 access point (ODU2P_AP); and
   an optical data unit of level 2 (ODU2) termination source process configured to map an ODU2P_AP into an optical data unit of level 2 termination connection point (ODU2_TCP).

8. The externally synchronized OTN network element of claim 1, wherein the circuitry comprises:
   a path optical data unit of level 3 (ODU3P) adaptation source process configured to map payloads up to 40 Gbps into a optical data unit of level 3 access point (ODU3_AP); and
   an optical data unit of level 3 (ODU3) termination source process configured to map an ODU3_AP into an optical data unit of level 3 termination connection point (ODU3_TCP).

9. The externally synchronized OTN network element of claim 1, wherein the circuitry is configured to perform the path optical data unit of level k (ODUkP) to optical data unit of level j and i (i is optional; i<j) (ODU[i|j]) adaptation source process while generating the OTUk[V].

10. The externally synchronized OTN network element of claim 1, wherein the circuitry is configured to perform the path optical data unit of level k (ODUkP) to constant bit rate signal of rate x (CBRx) adaptation source process while generating the OTUk[V].

11. The externally synchronized OTN network element of claim 10, wherein the externally synchronized OTN network element comprises a network synchronized transponder.

12. The externally synchronized OTN network element of claim 10, wherein the externally synchronized OTN network element comprises a network synchronized regenerator configured to de-map payload from a received optical data unit of level k (ODUk) and then re-map into a network synchronized ODUk.

13. The externally synchronized OTN network element of claim 12, wherein the network synchronized regenerator comprises 2×N synchronization circuits for synchronizing multiple channels at a common location, each 2×N synchronization circuit is configured to de-map payload from a received ODUk and then re-map into a network synchronized ODUk.

14. The externally synchronized OTN network element of claim 1, wherein the active timing reference comprises one or more of an external clock source reference, a line reference from a network side port, and a combination thereof.

15. The externally synchronized OTN network element of claim 1, wherein the OTN adaptation source processes for OTN multiplexing comprises adapting one or more OTN signals into another OTN signal.

16. An externally synchronized optical transport network (OTN) network element comprising:
   circuitry configured to generate a completely standardized or functionally standardized optical transmission unit of level k (OTUk[V]) from a plurality of sub rate OTN signals; and
   a clock synchronizer subsystem connected to the circuitry, wherein the clock synchronizer subsystem is configured to generate an output clock synchronous with an active external timing reference separate from a line timing reference and generated externally from the network element, and wherein the clock synchronizer subsystem is integrated within OTN adaptation source processes providing external timing within the OTN adaptation source processes for OTN multiplexing;
   wherein the circuitry is configured to de-map payload from a received optical data unit of level k (ODUk) and then re-map into a network synchronized ODUk utilizing the output clock synchronous with the active external timing reference.

17. An externally synchronized optical transport network (OTN) network element comprising:
   circuitry configured to generate a completely standardized or functionally standardized optical transmission unit of level k (OTUk[V]); and
   a clock synchronizer subsystem connected to the circuitry, wherein the clock synchronizer subsystem is configured to generate an output clock synchronous with an active external timing reference separate from a line timing reference and generated externally from the network element, and wherein the clock synchronizer subsystem is integrated within OTN adaptation source processes providing external timing from an external primary reference source of a particular stratum level within the OTN adaptation source processes for OTN multiplexing;
   wherein the circuitry is configured to de-map payload from a received optical data unit of level k (ODUk) and then re-map into a network synchronized ODUk utilizing the output clock synchronous with the active external timing reference.

* * * * *